United States Patent
Fix Fierro et al.

(10) Patent No.: US 11,339,098 B2
(45) Date of Patent: May 24, 2022

(54) PREPARATION METHOD OF NANOMETRIC SIZE METAL OXIDE ADDITIVES THAT REDUCE THE TEMPERATURE OF SINTERIZED AND/OR INCREASE PRODUCTIVITY IN THE MANUFACTURE OF CERAMIC PARTS, IMPROVING MECHANICAL PROPERTIES WITHOUT AFFECTING THE GRESIFICATION PROPERTIES OF CERAMIC BODIES, TILES OR COATINGS

(71) Applicant: NANOMATERIALS QUIMICOS AVANZADOS, S.A. DE C.V., Nuevo León (MX)

(72) Inventors: Carlos Fix Fierro, Nuevo León (MX); Guillermo Enrique Acosta González, Nuevo León (MX); Mónica Ibeth Aguilera Bustos, Nuevo León (MX); Joel Gutiérrez Antonio, Estado de México (MX)

(73) Assignee: NANOMATERIALS QUIMICOS AVANZADOS, S.A. DE C.V., Nuevo León (MX)

( * ) Notice: Subject to any disclaimer, the term of this patent is extended or adjusted under 35 U.S.C. 154(b) by 0 days.

(21) Appl. No.: 16/603,131

(22) PCT Filed: Jul. 20, 2017

(86) PCT No.: PCT/MX2017/000081
§ 371 (c)(1),
(2) Date: Oct. 4, 2019

(87) PCT Pub. No.: WO2018/186729
PCT Pub. Date: Oct. 11, 2018

(65) Prior Publication Data
US 2020/0115287 A1    Apr. 16, 2020

(30) Foreign Application Priority Data

Apr. 5, 2017    (MX) .................. MX/A/2017/004430

(51) Int. Cl.
*C04B 35/64*    (2006.01)
*C04B 35/626*    (2006.01)
(Continued)

(52) U.S. Cl.
CPC ........ *C04B 35/62615* (2013.01); *C04B 35/64* (2013.01); *B82Y 30/00* (2013.01);
(Continued)

(58) Field of Classification Search
CPC .............. C04B 35/62615; C04B 35/64; C04B 2235/3201; C04B 2235/3208;
(Continued)

(56) References Cited

U.S. PATENT DOCUMENTS 2,862,827 A * 12/1958 Boyce ..................... C04B 33/13
501/141
5,091,345 A * 2/1992 Becker ................ C04B 41/5022
501/14
(Continued)

FOREIGN PATENT DOCUMENTS

WO    WO 03/059840 A1 *    7/2003    ........... C04B 33/135

*Primary Examiner* — Noah S Wiese
(74) *Attorney, Agent, or Firm* — Nath, Goldberg & Meyer; Jerald L. Meyer; Tanya E. Harkins

(57) ABSTRACT

The object of this invention is a process for manufacturing, conditioning and stabilization of a family of base additives sodium, potassium, boron, silicon, zinc, calcium oxides, among others, prepared by physicochemical and chemical synthesis methods that form nanometric structures, reformulated with deflocculant, sequestrants and dispersants additives that allow to obtain a dispersion or powder capable (Continued)

to decrease the sintering temperature of a ceramic body due to the high fluxing power, which is maximized by the use of nanotechnology in the structures obtained. The process consists in the preparation of nucleation seeds of metal, silicates and carbonates oxides by means of a physicochemical process, and which allow nanometric structures to grow by means of a chemical process in a chemical synthesis process wet basis of sodium, boron, silicon, zinc, potassium and calcium oxides. The combination of these oxides allows structuring elements of high fluxing power due to their high surface area and physicochemical composition. The additives prepared in this invention are chemically stabilized with deflocculating agents, which allow the additives to be incorporated into the aqueous medium grinding process of the ceramic body. Applications made with the additives of this invention allow the sintering temperature of a red body to be reduced from 1150° C. to 1000° C. and in porcelain bodies from 1180° C. to 1050° C., with the use of 0.2 to 5% of the additive, or increasing the speed of the heat treatment by up to 20%, and it can be used in the manufacture of bathroom fittings, molding parts, components for tooling, coatings, valances, enamels, vitrified pastes and other ceramic components. The present invention proposes several nanostructured additive formulations with high performance fluxing properties, which allow to optimize and standardize the sintering process and to improve the mechanical properties of the ceramic body. It also proposes different methods of application of the additive in ceramic formulations.

12 Claims, 6 Drawing Sheets

(51) Int. Cl.
 *B82Y 30/00* (2011.01)
 *B82Y 40/00* (2011.01)

(52) U.S. Cl.
 CPC ....... *B82Y 40/00* (2013.01); *C04B 2235/3201* (2013.01); *C04B 2235/3208* (2013.01); *C04B 2235/3284* (2013.01); *C04B 2235/3409* (2013.01); *C04B 2235/3418* (2013.01); *C04B 2235/407* (2013.01); *C04B 2235/408* (2013.01); *C04B 2235/5454* (2013.01)

(58) Field of Classification Search
 CPC .... C04B 2235/3284; C04B 2235/3409; C04B 2235/3418; C04B 2235/407; C04B 2235/5454
 See application file for complete search history.

(56) References Cited

U.S. PATENT DOCUMENTS

| | | | | |
|---|---|---|---|---|
| 5,716,894 A | * | 2/1998 | Messer | C04B 33/16 501/141 |
| 5,849,649 A | * | 12/1998 | Poole | C03C 8/04 501/26 |
| 6,022,819 A | * | 2/2000 | Panzera | A61K 6/816 501/20 |

* cited by examiner

PREPARATION METHOD OF NANOMETRIC SIZE METAL OXIDE ADDITIVES THAT REDUCE THE TEMPERATURE OF SINTERIZED AND/OR INCREASE PRODUCTIVITY IN THE MANUFACTURE OF CERAMIC PARTS, IMPROVING MECHANICAL PROPERTIES WITHOUT AFFECTING THE GRESIFICATION PROPERTIES OF CERAMIC BODIES, TILES OR COATINGS

This is a National Phase Application filed under 35 U.S.C. 371 as a national stage of PCT/MX2017/000081, filed Jul. 20, 2017, an application claiming the benefit of Mexican Application No. MX/a/2017/004430, filed Apr. 5, 2017, the content of each of which is hereby incorporated by reference in its entirety.

FIELD OF THE INVENTION

The object of the present invention is a family of additives and their preparation process for the improvement of the sintering properties of ceramic bodies for industrialized floors and tiles, ceramic body for bathrooms and molding parts, ceramics for tooling containing high content of Zirconium, ceramic body for wall and frontage coating, valances and decoration material, enamel application, engobes and gloss, where nanostructures of sodium, potassium, boron, silicon, zinc, and calcium oxides, among others, are incorporated in the grinding process of the ceramic body components.

The product object of this invention makes it possible to decrease the sintering temperature of the red or porcelain ceramic body, and/or increase the sintering speed in smelting furnaces, improving the mechanical properties and maintaining the ceramic's gresification properties.

The present invention proposes several dispersion and nanoparticle powder formulations with deflocculating agents, stabilizers and rheology modifiers, stabilizing the product and contributing to the process of grinding and incorporation of the components.

The object of the present invention allows to minimize porosity problems, improve the sintering process, increase the breaking strength, homogenize the liquid phase in the sintering process and contribute to the fusion of quartz and other refractory phases.

The product derived from the process object of the present invention proposes formulations to integrate to the nanostructures products such as nano silver, nano copper and nano ZnO to confer at the same time antibacterial properties in exposed ceramics such as enamel, gloss or surface applications of high fluxing capacity that confer microbicidal properties to the contact surfaces.

BACKGROUND OF THE INVENTION

Ceramic materials are those products, parts or components consisting of inorganic, polycrystalline, non-metallic compounds, whose fundamental characteristic is that they are consolidated in a solid state by means of heat treatments at high temperatures.

As mentioned above, the manufacture of ceramics commonly includes a heat treatment stage, where the raw materials are converted into a dense solid, usually with porosities. This stage refers to the sintering process of a ceramic. In general, when wanted to produce a material with particular properties, it must be identified the required microstructure and design processing conditions that can produce this microstructure. The sintering equalization process consists of understanding variables such as temperature, particle size, density of the raw material due to the pressure applied in its molding, particle packing, composition and the influence of the atmosphere affect to the microstructure of the sintered body, the sintering process occurs when part of the particles melt between more refractory components, forming a liquid phase that contains refractory solids, in turn some of the solids partially melt on its surface to form a composite viscous phase which, when cooled, solidifies as a continuous phase with less porosity and better mechanical properties.

The high temperature to which a ceramic material is exposed results in several disadvantages, such as the increase in production costs, high maintenance costs, difficulty in quality control and high equipment costs. One way to reduce the costs involved in the sintering process is to reduce that temperature. In addition, this reduces energy consumption and, therefore, makes the process more environmentally friendly.

To reduce the sintering temperature of a ceramic, additives called fluxes are used. These agents affect the melting point of the ceramic ingredients, promoting melting or vitrification at low temperature. They can be used both in the ceramic body and in the enamel for bathroom, floor, tile or tooling applications.

The ceramic industry is a great consumer of energy supplies, mainly during the drying and smelting operations, stages that constitute a very important part of the manufacturing cost of its products. For the reasons mentioned above, it is sought to reduce energy consumption through the use of new formulations of low-cost raw materials that allow lowering the smelting temperature of ceramic products, adapting them to rapid processes, without affecting their specific qualities. That is, without loss of quality and functional properties such as the percentage of contraction, water absorption and mechanical resistance of ceramic products. The development of ceramic compositions that can be smelt at lower temperatures becomes more relevant when considering the fact that the greatest energy losses occur precisely at the highest temperatures. This would not only allow economizing in fuel consumption but would also make it possible to obtain other savings by increasing the useful life of the equipment used and its accessories, as well as minimizing the negative impact on the environment by greenhouse gas emissions.

Although this possibility has been investigated for a long time in various countries, the analysis of the literature related to the subject reveals that there is still a wide field of exploration in order to achieve the objective of lowering the smelting temperature of ceramic products.

Thus, the CN1974487A patent "Ceramic sintering fluxing agent" protects the production of a fluxing agent comprising three levels. The levels comprise various materials, which work together to reduce the sintering temperature of a ceramic. This fluxing agent allows to reduce the sintering temperature in the production of ceramics and, therefore, producing an energy saving effect and is based on a combination of 25-35% of $B_2O_3$, 28-37% of $K_2O+Na_2O$ and 23-42% of $CaF_2$, claims a temperature reduction of 100° C.-170° C. and is added in the sintering process at a concentration of 0.01-0.5%. The agent can be considered as an additive, since it is added in the process of sintering and is not within the formulation of the ceramic body, so the dosing process is not detailed and is not incorporated into the wet milling process of the components of a ceramic body.

The CN103833326A patent "Ceramic formula and preparation method for ceramic product" protects a ceramic formula useful for preparing any ceramic product. Said formulation contains clays, a solvent and a fluxing agent. It is mentioned that the preparation of the invention is cost effective, simple to prepare and reduces the investment in production; as well as the reduction of energy consumption. Its composition is 55-65 parts of clay, 20-30 parts of solvent and 15-23 of the fluxing agent, it does not specifically mention the type of flux, but it does work from 1,100-1,150° C. for 110-130 minutes at normal temperature for a ceramic body process but a very long processing time according to the industry standards.

The CN103664193A patent "Ceramic tile production process" claims the production of a tile, where the process stands out for using a sintering temperature lower than the conventional ones and therefore energy saving. This attribute is achieved by adding nanoparticles of zinc oxide into the ceramic formulation. The process is carried out at a low sintering temperature. The process has the same water content and little waste discharge. Energy saving and production of ceramic tiles with high resistance. The composition is 94-98 parts of the conventional ceramic formulation and 3-7 parts of nano-ZnO, with a sintering temperature of 1,030° C. although the cycle time in the furnace is not mentioned and in the process after the grinding, sieving and drying should be allowed to harden to form a spherical powder for subsequent heat treatment. The particle size of the nanometric ZnO is not mentioned. The application of zinc oxide nanoparticles to conventional ceramic production processes involves a very high cost at the mentioned concentrations and therefore it is unfeasible for an industrial application.

In CN103833338A patent "Nanometer quartz sand domestic ceramic" the invention develops domestic ceramics, specially made with nanometric quartz sand. By means of this nanomaterial a thermoset ceramic body is produced and relatively with a lower sintering temperature. The ceramic product has good heat and chemical stability, wear resistance, whiteness and uniform color. The sintering temperature is 1,318-1,345° C. for 15 to 18 hours, which is out of the standards of production of furnaces for ceramic bodies for bathrooms, floors, tiles, tiles, among others, despite claiming the use of nanometric structure. Additionally, double grinding is required in the process prior to sintering.

Regarding the use of fluxing materials and which can also provide antibacterial properties, the CN103145448A patent protects a preparation for producing a ceramic at low temperatures, with the aim of reducing production costs to add an antibacterial property. This method allows to prepare a bactericidal ceramic in an economical way for common viruses and bacteria such as *E. coli* and *S. aureus*. The material has a smooth surface, high breaking strength and chemical stability. The flux has a combination of: 0.05-3 parts of strontium carbonate, 0.05-3 parts of potassium nitrate, 0.05-3 parts of sodium nitrate, 0.05-3 parts of magnesium carbonate, 0.05-3 lithium nitrate, which in turn uses Nano-silver: 20-150 nm and Nano-Zinc Oxide: 20-200 nm to provide antibacterial properties and uses 0.5-10 parts of powdered zirconium dioxide as a reinforcing agent and as a hardening agent: 0.5-10 parts of hydrated zinc phosphate. The process to obtain the ceramic product with antibacterial property consists of: 1. Taking the flux components and taking them to a pearl mill for 30 minutes. 2. Placing them in an furnace at a temperature about 1,250° C.-1,400° C. and calcining them and letting them cool. 3. Placing the reinforcing agent. 4. Placing the hardening agent. 5. Placing the base ceramic ingredients: 40-60 parts of SiO2; 10-30 parts of Al2O3; and 5-20 parts of B2O3. 6. Mixing and grinding them through a 400 mesh screen. 7. Preparing the antimicrobial material with a 0.7:0.3 ratio of silver oxide and zinc oxide, respectively. 8. Combining the antimicrobial material and ceramic preparation with a 20:80 ratio. 9. Carrying out the sintering process at a temperature of 1000° C., this process is complex, it requires several steps and the compounds applied in the ceramic to achieve the objective of having antibacterial properties mentioned are from 95 to 99%.

The CN102643115A patent "Indoor natural-light photocatalysis antimicrobial energy-saving ceramic glaze and use method thereof", addressees the production of crystallized ceramic materials for architectural use and sanitary items. These products have the characteristic of having nanometric titanium dioxide to confer antimicrobial properties to the products by means of a photocatalytic mechanism. Also, energy is saved in the process, by reducing the sintering temperature. The elaboration of this ceramic reduces the sintering temperature, offers antimicrobial properties, reduces the cost of production, saves energy, does not present changes on the surface compared to conventional ones. The fluxing properties are obtained from the mixture of titanium dioxide with a particle size of 10 nm with aluminum hydroxide. The mixture of nano-TiO2 and aluminum hydroxide is added to the glazing ingredients of a brick or tile in a concentration of 20-40% with 99% antimicrobial effectiveness, the process of producing flux/antibacterial material consists of: 1. Dissolving the aluminum hydroxide in water by stirring. 2. Adding the nano-TiO2 with a particle size of 10 nm. 3. Stirring and heating the mixture for the solvent evaporation, until a solid-liquid ratio of more than 90% is obtained. 4. Adding this mixture to the glazed ceramic. 5. Sintering in a cycle ranging from 160-1200° C. for 42-75 minutes, the sintering range is very wide as well as time, although it can work at lower temperatures, according to the patent, 100° C. less than the conventional temperature, however, the effect on the ceramic body, or the properties of gresification are not mentioned.

From all of the above it can be observed that although efforts have been made to use nanoparticles or nanomaterials to lower the sintering temperature of the ceramic bodies so far the results, although original in regards of the concept, do not show elements that allow using these materials both to reduce the sintering temperature and to give antimicrobial properties, additionally it can be analyzed that although there are compositions that can reduce the sintering temperature by combining different materials such as sodium oxides, calcium, boron or calcium fluorides and minerals already known there is no material that can be used in the manufacture of ceramic bodies and enamels, therefore, the present invention claims the process for manufacturing, conditioning and stabilization of a family of base additives of oxides of sodium, potassium, boron, silicon, zinc, calcium, among others, prepared by physicochemical methods and chemical synthesis that form reformulated nanometric structures with deflocculating additives, stabilizers and rheological modifiers that allow obtaining a dispersion or powder with the ability to decrease the sintering temperature of a ceramic body by its high fluxing capacity, which is maximized by the use of nanotechnology in the structures obtained, the process consists in the preparation of nucleation seeds of metal oxides, silicates and carbonates by means of a physicochemical process, and which allow orderly structures of nanometric nature to grow through a chemical process in a chemical synthesis process in wet basis of sodium, boron, silicon, zinc, potassium and calcium oxides. The combination of these oxides allows structuring elements of high fluxing capacity due to their high surface area and physicochemical composition. The product object of this invention allows to reduce the sintering temperature of the red or porcelain ceramic body, and/or increase the sintering speed in industrial furnaces, improving the mechanical properties and maintaining the ceramic's gresification properties, in additionally in combination with nano silver, nano copper and ZnO it can be used as fluxes and antimicrobial agents in enamels.

In summary of the analysis of the prior art, it is shown that the nanometric products used as fluxing agents have the property of lowering the sintering temperature of the ceramic bodies; however the application concentrations are very high because they are incorporated as single or combined agents with a single additional element, while the process and the family of additives indicated in the present invention consist of a process for manufacturing nanostructures serving as nucleating agents for low-cost precursors, the proportion of primary nanostructures is such that it allows to achieve formulation of nanometric base additives using low concentrations of primary nanostructured agents and in turn it allows the formation of new nanostructures in an economic and simple process, which in turn allows low application concentrations ranging from 0.25% to 10%, preferably less than 5%.

DETAILED DESCRIPTION OF THE INVENTION

The present invention describes a family of fluxing nanostructured additives and their production process, which can be presented in aqueous dispersion-dissolution or powder, are applied to ceramic bodies in the process of grinding or integration of body components and prior to formation via by pressing, molding or emptying of the ceramic component. Which allow to achieve an equalized sintering at lower temperatures and/or at lower thermal cycle times.

The process of integrating the components into the formula plays a preponderant role in the result of the fluxing capacity of the additive, since it allows structures to be formed with a high surface area and a low melting chemical composition. The formulations that can be developed with the process object of the present invention allow to be incorporated into different processes of integration in the wet basis without making changes to the process and with minor modifications in the formulation.

Figure 1:
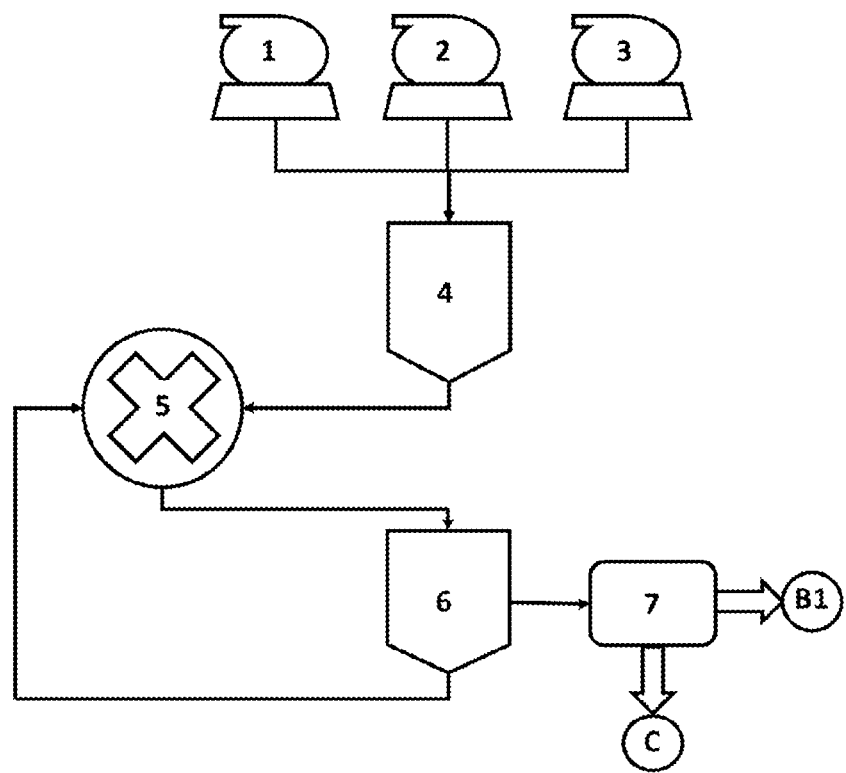
FIG. 1 Schematization of the process of preparation of nanostructures of oxides, carbonates and silicates of the precursor metals by means of a physicochemical sequence of particle size reduction, consisting of a wet basis high-energy mill, a slurry preparation tank and its addition elements, and finally a dispersion tank assembled to the mill by a recirculation system for particle size control.
Figure 2:
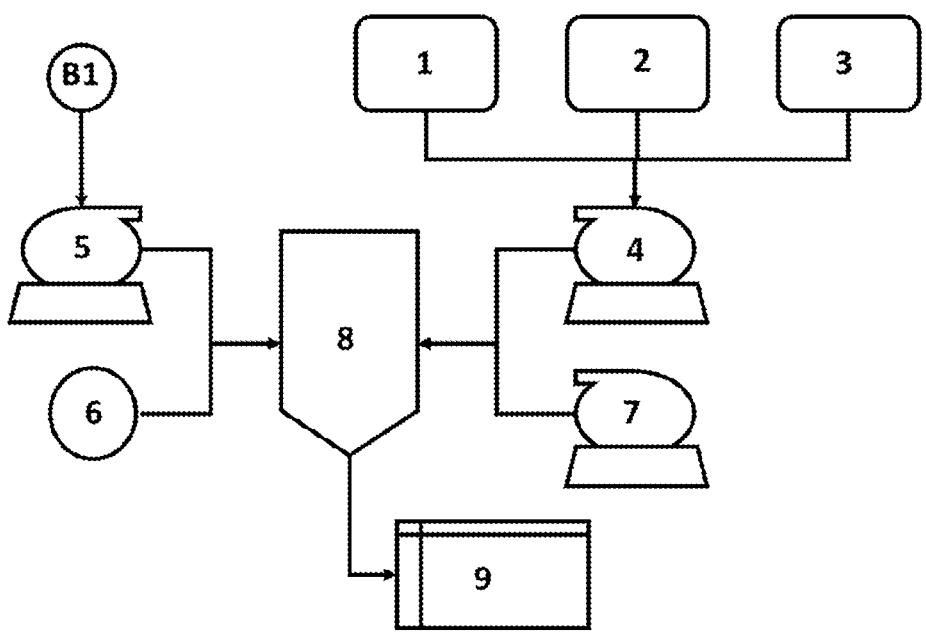
FIG. 2 Scheme depicting the process of preparing nanostructures by chemical route, using as primary elements or nucleation seeds, nanostructures obtained by physicochemical process and consisting of the wet basis addition of up to 5 reagents and a dosage system of antibacterial additives and control of stability, dispersion and deflocculation according to the type of application in the ceramic body.

The reagent preparation process consists of two stages described as A and B, stage B is divided into two types of processing according to the type of material to be obtained, liquid (B1) or powder (B2); in stage A (FIG. 1) a physicochemical process is involved in which the silicates, oxides and carbonates of precursor metals can be miniaturized at nanometric particle size levels. This physicochemical process consists of an aqueous attrition mill which is fed from an aqueous dispersion of the compound to be ground in concentrations ranging from 5% to 50%, preferably from 10 to 30%, the particle size of the precursors is 1 micrometer to 50 micrometers, the milling is stabilized and dispersed using rheological modifiers, controlling the pH of the dispersion, among which are polyacrylates, amines, silicates, citrates, lignins, lignosulfonates, hydroxylated stearates, hydroxides and weak organic acids, anionic polymers, cationic polymers, among others. During the grinding process the particle size can be controlled by the process time allowing a stable dispersion with high solids content, with particle size ranging from 1 micrometer to 50 nanometers, preferably from 50 nm to 500 nanometers. The particle size polydispersity can be controlled depending on the type of dispersant and the control of the potential Z of the dispersed particles, the by-product obtained is a stable dispersion of particles with a composition with fluxing capacity that must be complemented with a low melting point composition chemically structured to achieve melting points below 600° C. In step B1 of product manufacturing a chemical synthesis process is carried out to achieve the composition of metal oxides of low melting point, the morphology and size of the structures is essential in the sintering process in the application, since with smaller size of the structures is possible to obtain a larger surface area, which allows the structures to melt with less energy due to the high surface energy it contains. The production process in stage B consists in obtaining structured composite products of metal oxides of nanometric size of Si, Ca, Na, K, B, Zn, Al and P, such compounds are formed on the surface of the physicochemically obtained particles (stage A), previously dispersed in the aqueous dispersion (FIG. 2), adding in a controlled manner five precursors and an additive to a reactor where the stirring speed between 400 and 1000 RPM is controlled with a marine type propeller, in a process in batch. During the process of adding the reagents in sequence, the agitation speed is progressively increased as the volume and viscosity of the dispersion-dissolution increases, the reagents in this process can be added in liquid and/or powder according to the desired solids composition according to the following ratio: reagent 1: 65-75%, reagent 2: 15-20%, reagent 3: 5-10%, reagent 4: 5-10%, reagent 5: 1-2%, where reagents 1, 2, 3 and 5 can be liquid, while reagent 4 is a powder. To improve the process of integration of the latter, it is possible to perform a prior aqueous dispersion.

The process sequence for step B1 described (FIG. 2) consists in first feeding to the reactor the dispersion of particles obtained from the by-product derived from the process of step A, followed by reagent 1, once the desired quantity of reagent 1 has been fed, the reactor agitation system is started at 550-650 rpm, reagent 1 is kept under agitation for a time ranging from 5 to 15 minutes, then reagent 2 is fed followed by reagent 3 to the reactor by using the dosing system in a total time ranging from 2 to 10 minutes, after 2 to 5 minutes after the end of the previous addition, reagent 4 is incorporated and the stirring speed is increased from 700 to 1000 rpm, keeping these conditions of agitation for a time ranging from 10 to 20 minutes. In the case of reagent 4 it is possible to make a previous dispersion in water by using a mechanical stirring system at a stirring speed of between 500-600 rpm, to finish the reagent 5 is added to the reactor and the speed of stirring is adjusted at 500 rpm holding it for 10 minutes. For the conditioning of the product depending on the application, the additive is added in the formulation in proportions ranging from 5 to 15% by weight of the final formulation. The additive consists of rheological modifying elements, deflocculants that allow the incorporation of the product in different stages of the production process of industrialized ceramic pieces.

The reagents and additives consist of a mixture of the precursor agents that can be dissolved according to the described sequence of the stage process, which in turn recrystallize using as forming core particles previously obtained by physicochemical process, within the precursors are acids and strong bases, acids and weak bases, carbonates, silicates, borates, nitrates, phosphates, aluminates, chlorides, bromides, fluorides and oxides, of silicon, calcium, potassium, boron, zinc, sodium, magnesium and aluminum, whereby products are obtained that, depending on their application, contain compositions ranging from 30 to 50% sodium oxide, 30 to 50% silicon oxide, 0 to 30% boron oxide, 0 to 10% potassium oxide, 1 to 5% calcium oxide, 0 to 1% aluminum oxide.

Figure 3:
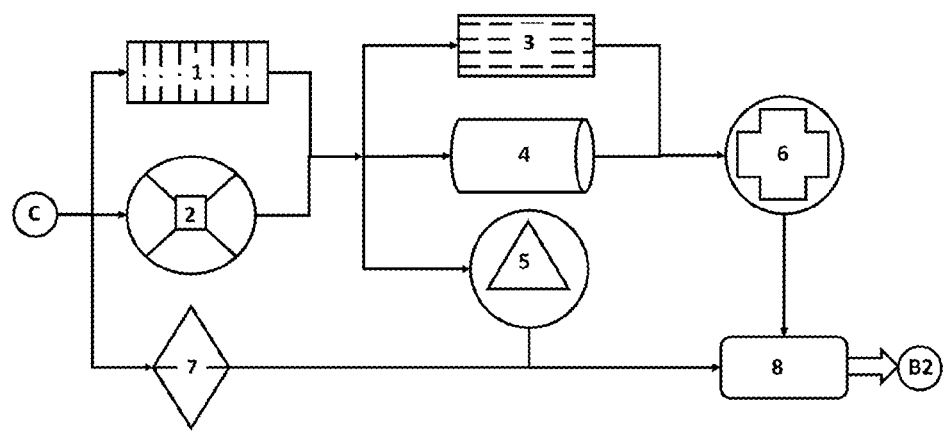
FIG. 3 Schematic representation of the process of drying the dispersion of nanoparticles in wet basis and consisting of a filtration process by press or centrifuge and its subsequent drying in tray furnaces, rotary furnace or flash oven, except for the latter, the dry product passes to a grinder. As an alternative to the filtration system, a spray dryer is schematized which allows obtaining product in a single process.
Figure 4:
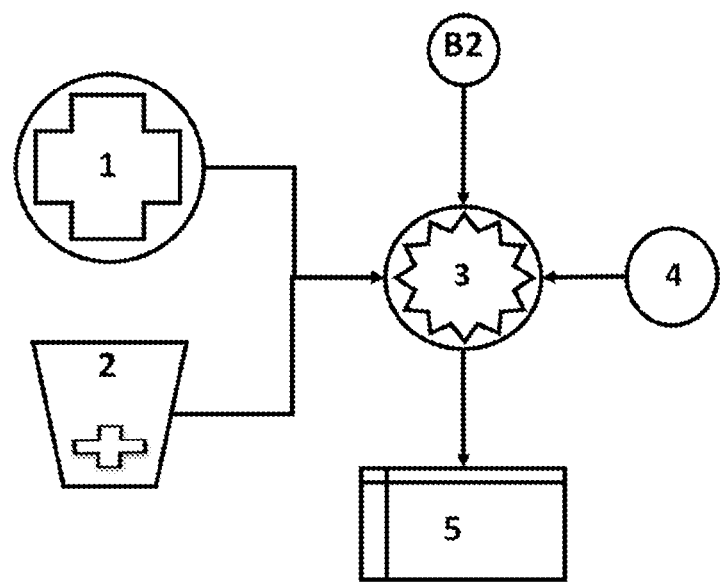
FIG. 4 Schematic representation of the product preparation process using a high-kinetic ball rotor mill, which is fed with nanostructures obtained from the previously dried physicochemical process and powdered and integrated precursor reagents, which are conditioned according to two procedures, the first consists of an individual pulverization of the reagents in a hammer mill or a disk mill and their subsequent addition to the high energy mill, while the second allows the integration of the reagents in a high speed mixing system and then add them to the high energy mill.
Figure 5:
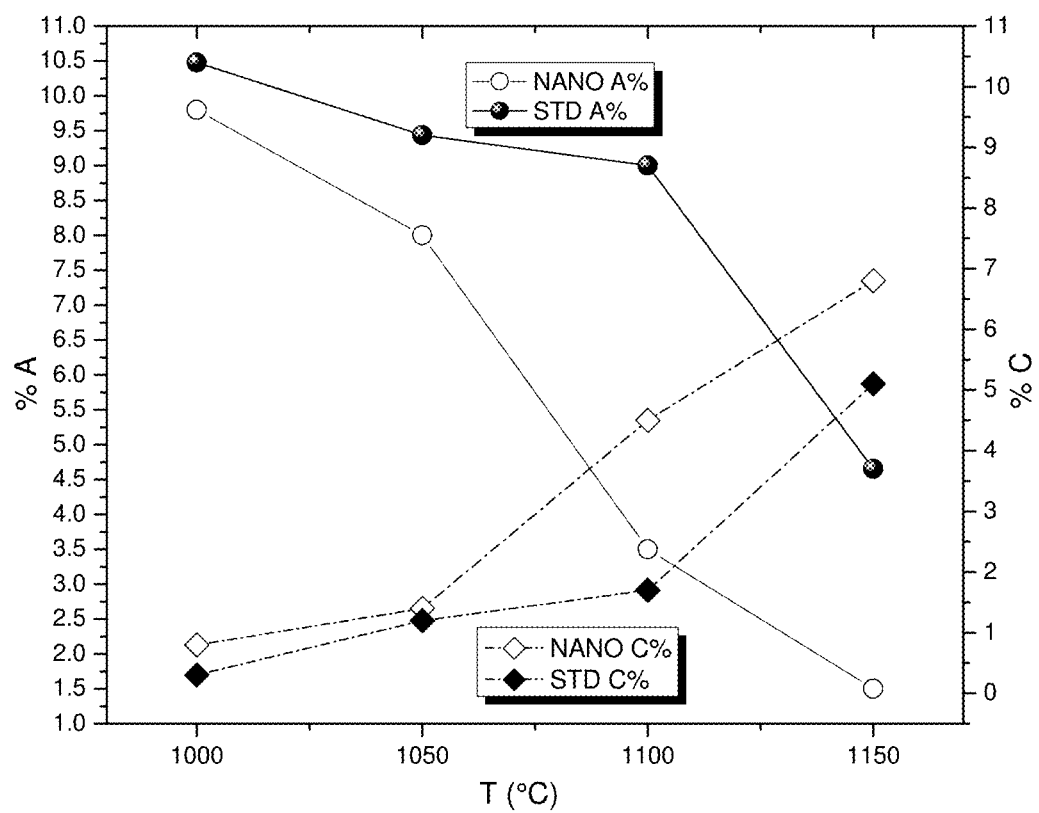
FIG. 5 Gresification diagram of a ceramic body added with the nanofunction product compared to a standard ceramic body.
Figure 6:
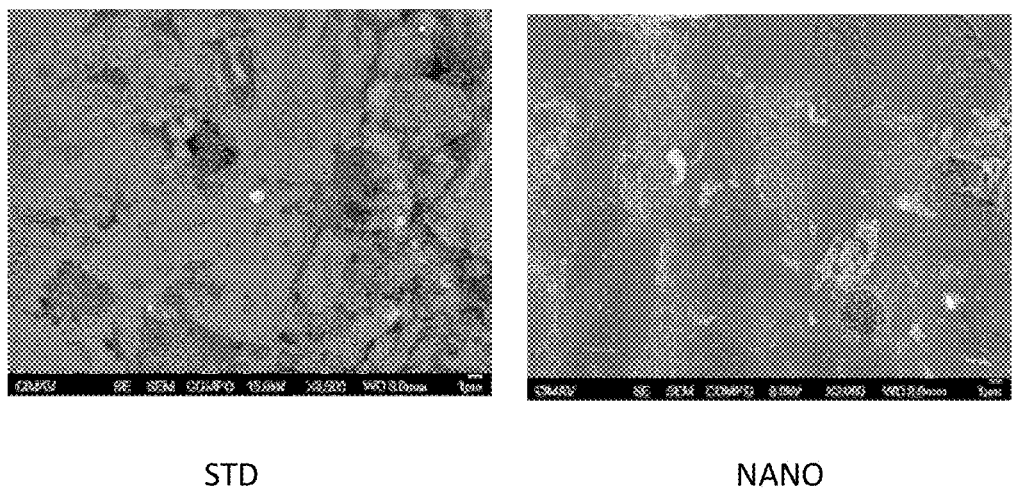
FIG. 6 Microstructures obtained by scanning electron microscopy of a ceramic body with 5% nano fluxing additive treated at 1050° C. compared to a standard ceramic body without additive, where the drawing on the left represents the material without additive and non-sintered particles are seen, while on the right the drawing shows the microscopy of the sintered body due to the presence of the nano additive.

As a variant of the production process for stage B, a high energy mill is used to achieve the integration and reaction of the components of the formula by means of the mechanosynthesis of reagents preferably incorporated in solid (step B2), keeping the proportions of oxides sought for the product, the precursors are integrated by a pulverization and mixing process, this process is integrated but not limited to the following processes and equipment (FIG. 4), a) pulverization of reagents 1, 2, 3, 4 and 5 (solids) using a hammer mill, a disk mill or similar equipment to obtain a powder with a particle size of less than 500 micrometers for each of the reagents. Integration of the components in a high energy grinding process using a planetary mill or high kinetic energy ball mill as a reactive grinding element, performing a reagent mechanosynthesis, the product is added in the last stage of the integration process using low speeds, other additives can be added in the process of integrating the flux into the ceramic material. b) Integration of 2 to 3 reagents maintaining the proportion of final oxides in a high-speed mixing process (1500 to 3000 RPM) and the subsequent reaction in high energy mills. In both processes corresponding to stage B2, the nanometric compounds obtained from stage A are added by physicochemical process after drying and pulverizing the by-product particles (FIG. 3) of the first stage according to the scheme described in FIG. 3. The nanostructures obtained from the stage A production process are incorporated in this stage B2 as powder, the production process of these particles as described in FIG. 3 can be taken to a filter press, or a centrifuge to obtain a cake that is then taken to a drying process in a tray furnace or a rotary furnace and as a last option to flash furnace to obtain the final product, in the case of trays or rotary furnace, it is necessary to pass the material through a grinder to achieve granulometry suitable for the next stage of the process. As an alternative to this drying process, a spray dryer is outlined, which allows to obtain the necessary product in a single step.

This invention allows to obtain a liquid or powder compound product that is added to the industrialized production process in the grinding stage of the clays and components of the ceramic body, the inclusion of the fluxing additive can also be carried out for dry grinding and during subsequent stages to the milling process and prior to drying by trays, spray drying and any other similar process, among the applications described in the present invention are: body for red ceramic floor, ceramic porcelain floor tile, ceramic body for bathroom and pieces of molding, tooling ceramics that contain high zirconium content, ceramic body for wall and facade coating, valances and decoration material, enamel application, engobes and gloss with the addition of silver, copper or zinc oxide nanoparticles that allow preparation of antibacterial surfaces using concentrations ranging from 100 parts per million at 5% maximum of antibacterial nanoparticles in the last ceramic layer of the product.

The family of additives obtained from the described processes subject to this invention, which contain nanostructures as primary elements, are presented in aqueous dispersion with a density ranging from 1.1 to 1.7 g/mL, preferably from 1.3 to 1.6 g/mL, while the solids content ranges from 35 to 60% preferably from 40 to 50% with a pH of 10 to 14.

The powdered additives are presented with a granulometry of less than 500 microns, preferably between 1 and 75 microns, the free moisture content is less than 10%, preferably less than 5%.

Additives used in concentrations ranging from 0.25 to 3% in the ceramic body formulation allow to improve the sintering process, reducing the heat treatment time by 1 to 15% according to the application and/or lower the temperature of heat treatment at a rate of 0 to 50 degrees Celsius, while using these in concentrations of 3 to 10%, it allows decreasing sintering temperature at a rate of 50 to 150 degrees Celsius at the same smelting time and/or decrease the heat treatment time at a rate of 5 to 25%, according to the application ceramic material and process conditions.

For the incorporation of additives in the ceramic materials, these can be added to the process water prior to the milling process, in the mill as an additive, in a process of incorporation after the formation of the slip after the milling process, in a powder mixer prior to the pressing or molding process, among other methods, as long as the process properties are met according to each stage. The formulation of the additive is defined by the type of ceramic body, the incorporation methodology and the process properties, maintaining the operating conditions with minimal changes.

The properties of the modified ceramic body with the fluxing nanoadditives object of this invention were evaluated to determine the gresification curves, the mechanical properties, appearance, X-ray diffraction analysis, thermogravimetric analysis, scanning electron micrographs, which determines that the additives improve the sintering process at a low concentration, representing a low cost possibility to reduce production costs and minimize the carbon footprint.

In order to better understand the properties of the additives object of this invention, some examples of the formulations and application methods, manufacturing methods and evaluations of the characteristics of the materials are shown below.

Example 1

In the premixed tank for slurry preparation (FIG. 1), 100 to 250 kg of water are added, followed by stabilizing and moisturizing additives, then 100 to 200 kg of the material to be ground are added to the tank maintaining intense agitation for correct incorporation, using a notched disk disperser and a speed from 500 to 1500 RPM, the particles to be ground with sizes just below 45 microns are integrated in the dispersion until reaching the desired solids concentration, which ranges from 10 to 50% by adjusting the pH with an acid or base to reach a Z potential above 50 at absolute value.

Once the dispersion has been carried out, it passes through a high energy attrition mill at 800 to 1200 RPM in the milling chamber agitator, the material recirculates between the dispersion tank and the mill, controlling the particle size with laser light scattering equipment until reaching a nanometric scattering, the pH is controlled at all times and upon reaching the target size between 50 and 500 nm depending on the material, it is taken to the storage tank.

The nanostructures obtained from this process and which are the primary element of the subsequent reaction are subject to a drying process through a press filter until a solids content range between 40 and 60% is reached achieving a consistent paste that is subsequently dried in a tray furnace at 140° C. until a humidity of less than 5%, preferably less than 1%, is reached, the slabs obtained are passed through a hammer sprayer to obtain a fine powder.

The nanostructured powder is taken to a dry high energy ball mill, where the previously sprayed reactive components are added by adjusting the proportions to 30 to 50% of sodium oxide, 30 to 50% of silicon oxide, 0 to 30% of boron oxide, 0 to 10% of potassium oxide, 1 to 5% of calcium oxide, 0 to 1% of aluminum oxide. In the formulation, 2 to 10% of nanoparticles prepared by physicochemical process are included in the formulation, the mechanosynthesis achieved in the dry high energy milling process is achieved at speeds above 400 RPM and up to 900 RPM, in an air environment.

The product is added with antimicrobial agents only in the case of coatings, in the final part of the process and it is integrated at speeds ranging from 200 to 400 RPM. To finally obtain the final powder product.

Example 2

In a process similar to example 1, the dispersion of dispersion nanostructures obtained from the physicochemical process of aqueous milling is taken and it is transferred to a reactor in a wet basis where the reagents are added to achieve a proportion ranging from 30 to 50% of sodium oxide, 30 to 50% of silicon oxide, 0 to 30% of boron oxide, 0 to 10% of potassium oxide, 1 to 5% of calcium oxide, 0 to 1% of aluminum oxide. Once the integration of the reagents is achieved, an additive that provides antibacterial and antifungal properties is added in a low proportion, to finally be added with rheological modifiers in the case of the integration of the additive in mills. in a wet basis.

The product is obtained in liquid in a dispersion-solution of stable nanostructures that can be added to a ceramic body to confer fluxing properties, and only in the case of formulations with antimicrobials to form low melting point antimicrobial surfaces.

Example 3

In a 1 L ball mill dedicated for milling ceramic materials with a 1:1 ball load with the ceramic body, the ceramic body was incorporated and a deflocculant additive was added at a concentration of 0.1 to 0.5% base solids, with a proportion of solids in water ranging from 50 to 70%, preferably from 60 to 68%, and a total milling time of 8 to 15 minutes for 300 to 600 g of solids, a slip of standard material is obtained which is compared under the same conditions by adding nanoflux additive in a proportion of 0.25 to 3 wt % base solids of the additive against the ceramic body. A slip is obtained which is subsequently dried and processed to a particle size of less than 500 microns, with this powder specimens are prepared in cylindrical and rectangular prism pieces for the evaluation of the curves of gresification, in the pressing process humidity is maintained between 3 to 8%, after the pressing process the pieces are dried and transferred to the heat treatment process.

The absorption properties of water in the non-additive material correspond to the heat treatment temperature at 12 to 20% for 1000° C., 8 to 18% for 1050° C., 8 to 15% for 1100° C., and 3 to 8% for 1150° C., while for the body with the nanoflux additive it corresponds to 8 to 18% for 1000° C., 5 to 12% for 1050° C., 3 to 8% for 1050° C. and 0.5 to 3% for 1150° C. In the case of contraction for the standard ceramic body, contractions were found from 0 to −2% for 1000° C., 0 to −3% for 1050° C., 0 to 3% for 1100° C. and 4 to 6% for 1150° C., while for the body with nanoadditives between −1 to 2% for 1000° C., −2 to 5% for 1050° C., 1 to 7% for 1100° C. and 1 to 7% for 1150° C., in the last two cases in concentrations greater than 1% of the additive in the ceramic body it was found that the ceramic body exceeded the ideal sintering temperature reaching the expansion zone, therefore the optimum sintering temperature decreased with the use of nanoadditives in proportions less than 3% at 50 to 100 degrees Celsius.

Example 4

In a 1 L ball mill dedicated for milling ceramic materials with a 1:1 ball load with the ceramic body, the ceramic body was incorporated and a deflocculant additive was added at a concentration of 0.1 to 0.5% base solids, with a proportion of solids in water ranging from 50 to 70%, preferably from 60 to 68%, and a total milling time of 8 to 15 minutes for 300 to 600 g of solids, a slip of standard material is obtained which is compared under the same conditions by adding nanoflux additive in a proportion of 3 to 7 wt % solid base of the additive against the ceramic body. A slip is obtained which is subsequently dried and processed to a particle size of less than 500 microns, with this powder specimens are prepared in cylindrical and rectangular prism pieces for the evaluation of the curves of gresification, in the pressing process humidity is maintained between 3 to 8%, after the pressing process the pieces are dried and transferred to the heat treatment process.

The absorption properties of water in the non-additive material correspond to the heat treatment temperature at 12 to 20% for 1000° C., 8 to 18% for 1050° C., 8 to 15% for 1100° C., and 3 to 8% for 1150° C., while for the body with the nanoflux additive it corresponds to 4 to 10% for 1000° C., 3 to 8% for 1050° C., 1 to 8% for 1050° C. and 0.5 to 2% for 1150° C. In the case of the contraction for the standard ceramic body, contractions were found from 0 to −2% for 1000° C., 0 to −3% for 1050° C., 0 to 3% for 1100° C. and 4 to 6% for 1150° C., while for the body with nanoadditives between −1 to 6% for 1000° C., −1 to 8% for 1050° C., 1 to 3% for 1100° C. and finally −3 to 7% for 1150° C., in the bodies treated with nanoadditive, it was found that the ideal sintering temperature was exceeded reaching the expansion zone, therefore the optimum sintering temperature decreased with the use of nanoadditives at 50 to 150 degrees Celsius.

Example 5

According to methodology of examples 3 and 4, heat treatments are carried out in a flask taking the material to 1050° C. for 30 min and 120 min using nanoflux additive concentrations between 3 to 10%, preferably from 5 to 7%, while the standard material does not contain nanoflux. For the treatment performed at 30 minutes, contractions between 2 to 4% for the standard material were obtained while for the nanoadditive material the contraction reaches 3 to 8%, on the other hand the percentage of absorption for the standard ranges from 14 to 16% while for the nanoadditive material it reaches 1.5 to 4.5%, which represents a better sintering of the ceramic body, promoted by the presence of the melting materials in the formulation.

In the case of heat treatment at 120° C., a percentage of water absorption for the standard of 10 to 12% was obtained while the nanoflux material reached a water absorption of 0.03 to 1.48%, in the case of contraction in standard, values between 4 to 6% were obtained, while for the nanoadditive material values of 0.3 to 5.4% were found, in most cases the ceramic body was over sintered which means that it was found in expansion.

Example 6

Based on the procedure set forth in Example 5, a heat treatment was performed at 1140° C. for 30 minutes using nanoflux in a proportion between 1 and 3% with respect to the ceramic body, the percentage of absorption shown for the standard material is between 2 and 5%, while the additive material reached a water absorption of 0.2 to 0.5%.

It is noted that in connection to this date, the best method known by the applicant to implement said invention is the one clearly resulting from the description of this invention.

What is claimed is:

1. A process for preparing nanostructured additives from nanoparticles, comprising the steps of:
a) performing a physicochemical process to produce nanoparticles, wherein the physiochemical process comprises:
preparing an aqueous dispersion of at least one precursor metal, wherein the at least one precursor metal is at least one of a silicate, an oxide and a carbonate of a metal selected from the group consisting of Si, Ca, Mg, Na, K, B, Zn, Al, P and compounds and combinations thereof;
grinding the aqueous dispersion of the at least one precursor metal in a mill to produce a ground product in aqueous suspension; and
stabilizing the ground product in the aqueous suspension and dispersing the ground product in the aqueous suspension with at least one rheology modifier to produce a stable suspension of nanoparticles and metal oxides, the at least one rheology modifier being selected from the group consisting of a polyacrylate, an amine, a silicate, a citrate, a lignin, a lignosulfonate, a hydroxylated stearate, a hydroxide, a weak organic acid, an anionic polymer, a cationic polymer, and combinations thereof; and
b) performing a chemical synthesis process, comprising the steps of:
preparing first, second, third, fourth and fifth reagents, wherein the first reagent comprises a first portion of the metal oxides produced in step a) suspended in a first liquid medium, the second reagent comprises a second portion of the metal oxides produced in step a) suspended in a second liquid medium, the third reagent comprises a third portion of the metal oxides produced in step a) suspended in a third liquid medium, the fourth reagent comprises a fourth portion of the metal oxides produced in step a) mixed in a powdered solid medium, and the fifth reagent comprises a fifth portion of the metal oxides produced in step a) suspended in a fifth liquid medium, wherein the first portion of the metal oxides comprises 65-75 wt % of the first reagent, the second portion of the metal oxides comprises 15-20 wt % of the second reagent, the third portion of the metal oxides comprises 5-10 wt % of the third reagent, the fourth portion of the metal oxides comprises 5-10 wt % of the fourth reagent, and the fifth portion of the metal oxides comprises 1-2 wt % of the fifth reagent;
feeding the stable suspension of nanoparticles and the first reagent into a reactor with an agitation speed of 550-650 rpm;
feeding the second reagent into the reactor;
feeding the third reagent into the reactor;
feeding the fourth reagent into the reactor and increasing the agitation speed to 700-1000 rpm;
feeding the fifth reagent into the reactor and decreasing the agitation speed to 500 rpm;
adding an additive to the first, second, third, fourth and fifth reagents inside the reactor, wherein the additive is selected from the group consisting of a rheological modifying agent, a deflocculant, and a combination thereof;
removing a suspension of nanostructured additives from the reactor; and
extracting the nanostructured additives from the suspension.

2. The process for preparing nanostructured additives from nanoparticles as recited in claim 1, wherein the nanoparticles in the stable suspension of nanoparticles have a concentration of between 5 wt % and 50 wt %.

3. The process for preparing nanostructured additives from nanoparticles as recited in claim 1, wherein the nanoparticles in the stable suspension of nanoparticles have a concentration of between 10 wt % and 30 wt %.

4. The process for preparing nanostructured additives from nanoparticles as recited in claim 1, further comprising the step of storing the nanostructured additives.

5. The process of preparing nanostructured additives from nanoparticles as recited in claim 1, wherein nanostructured additives comprise nanometer scale oxides of a metal selected from the group consisting of Si, Ca, Mg, Na, K, B, Zn, Al, P and compounds and combinations thereof, the nanostructured additives having a density between 1.1 and 1.7 g/mL, a solids content between 35% and 60%, and a pH between 10 and 14.

6. The process of preparing nanostructured additives from nanoparticles as recited in claim 5, wherein the density is between 1.3 and 1.6 g/mL, and the solids content is between 40% and 50%.

7. The process of preparing nanostructured additives from nanoparticles as recited in claim 5, wherein the nanostructured additives comprise:
   30 wt % to 50 wt % sodium oxide;
   30 wt % to 50 wt % silicon oxide;
   0 wt % to 30 wt % boron oxide;
   0 wt % to 10 wt % potassium oxide;
   1 wt % to 5 wt % calcium oxide; and
   0 wt % to 1 wt % aluminum oxide.

8. A process for preparing nanostructured additives from nanoparticles, comprising the steps of:
   a) performing a physicochemical process to produce nanoparticles, wherein the physiochemical process comprises:
      preparing an aqueous dispersion of at least one precursor metal, wherein the at least one precursor metal is at least one of a silicate, an oxide and a carbonate of a metal selected from the group consisting of Si, Ca, Mg, Na, K, B, Zn, Al, P and compounds and combinations thereof;
      grinding the aqueous dispersion of the at least one precursor metal in a mill to produce a ground product in aqueous suspension; and
      stabilizing the ground product in the aqueous suspension and dispersing the ground product in the aqueous suspension with at least one rheology modifier to produce a stable suspension of nanoparticles and metal oxides, the at least one rheology modifier being selected from the group consisting of a polyacrylate, an amine, a silicate, a citrate, a lignin, a lignosulfonate, a hydroxylated stearate, a hydroxide, a weak organic acid, an anionic polymer, a cationic polymer, and combinations thereof;
   b) performing a chemical synthesis process, comprising the steps of:
      preparing first, second, third, fourth and fifth reagents, wherein the first reagent comprises a first portion of the metal oxides of step a) mixed in a first powdered solid medium, the second reagent comprises a second portion of the metal oxides of step a) mixed in a second powdered solid medium, the third reagent comprises a third portion of the metal oxides of step a) mixed in a third powdered solid medium, the fourth reagent comprises a fourth portion of the metal oxides of step a) mixed in a fourth powdered solid medium, and the fifth reagent comprises a fifth portion of the metal oxides of step a) mixed in a fifth powdered solid medium, wherein the first portion of the metal oxides comprises 65-75 wt % of the first reagent, the second portion of the metal oxides comprises 15-20 wt % of the second reagent, the third portion of the metal oxides comprises 5-10 wt % of the third reagent, the fourth portion of the metal oxides comprises 5-10 wt % of the fourth reagent, and the fifth portion of the metal oxides comprises 1-2 wt % of the fifth reagent;
      mixing the first, second, third, fourth and fifth reagents with nanoparticles extracted from the stable suspension of nanoparticles of step a) to form an intermediate mixture; and
      grinding and milling the intermediate mixture to produce a mixture of nano structured additives.

9. The process for preparing nanostructured additives from nanoparticles as recited in claim 8, wherein the step of grinding and milling the intermediate mixture comprises:
   pulverizing the intermediate mixture in a hammer mill; and
   feeding the pulverized intermediate mixture into a ball rotor mill.

10. The process for preparing nanostructured additives from nanoparticles as recited in claim 9, wherein the step of grinding and milling the intermediate mixture further comprises mixing the intermediate mixture in a high-speed mixing system prior to the step feeding the pulverized intermediate mixture into a ball rotor mill.

11. The process for preparing nanostructured additives from nanoparticles as recited in claim 8, wherein the step of grinding and milling the intermediate mixture comprises:
   pulverizing the intermediate mixture in a disk mill; and
   feeding the pulverized intermediate mixture into a ball rotor mill.

12. The process for preparing nanostructured additives from nanoparticles as recited in claim 11, wherein the step of grinding and milling the intermediate mixture further comprises mixing the intermediate mixture in a high-speed mixing system prior to the step feeding the pulverized intermediate mixture into a ball rotor mill.

\* \* \* \* \*

UNITED STATES PATENT AND TRADEMARK OFFICE
CERTIFICATE OF CORRECTION

PATENT NO. : 11,339,098 B2
APPLICATION NO. : 16/603131
DATED : May 24, 2022
INVENTOR(S) : Carlos Fix Fierro et al.

It is certified that error appears in the above-identified patent and that said Letters Patent is hereby corrected as shown below:

On the Title Page

Please delete Item (71) the Applicant "NANOMATERIALS QUIMICOS AVANZADOS, S.A. DE C.V." and replace with "NANOMATERIALES QUIMICOS AVANZADOS, S.A. DE C.V.".

Signed and Sealed this
Thirteenth Day of June, 2023

Katherine Kelly Vidal
*Director of the United States Patent and Trademark Office*